Feb. 18, 1936.      H. E. HOLLMANN      2,030,872
ULTRA-SHORT WAVE RECEIVER
Filed July 11, 1934
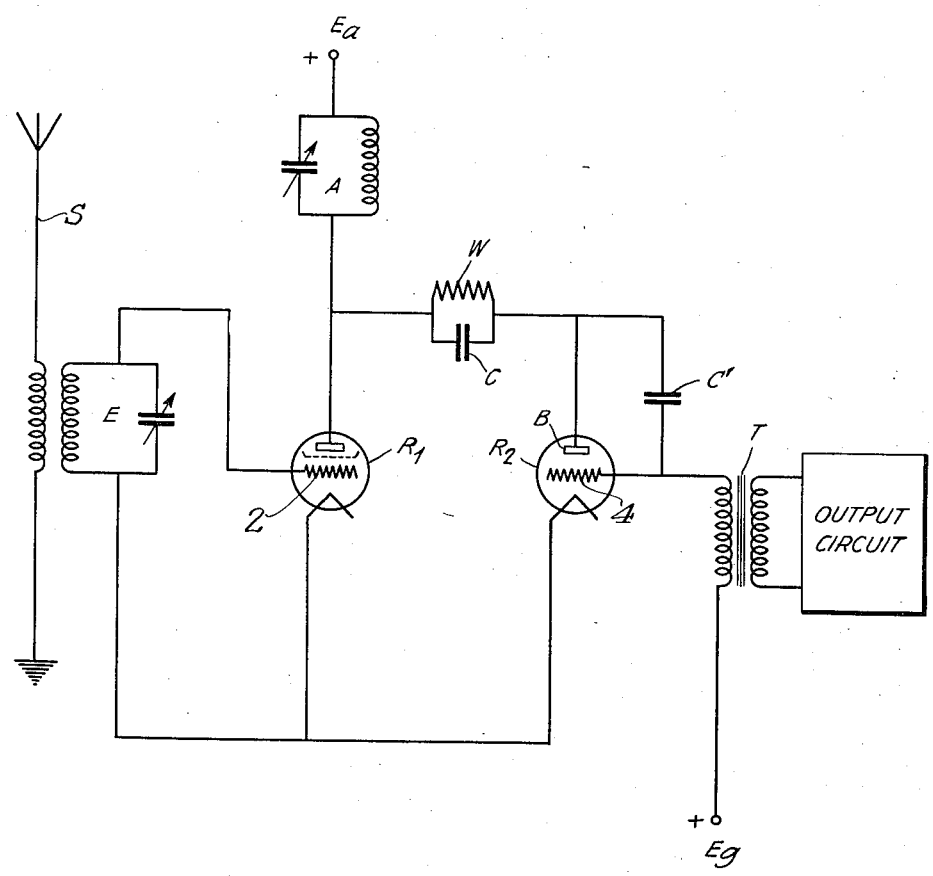
INVENTOR
HANS ERICH HOLLMANN
BY
ATTORNEY Patented Feb. 18, 1936

2,030,872

UNITED STATES PATENT OFFICE 2,030,872

ULTRA-SHORT WAVE RECEIVER

Hans Erich Hollmann, Berlin, Germany, assignor to Telefunken Gesellschaft für Drahtlose Telegraphie m. b. H., Berlin, Germany, a corporation of Germany Application July 11, 1934, Serial No. 734,605
In Germany July 19, 1933

3 Claims. (Cl. 250—20)

This invention relates to ultra-short wave radio receivers, and has for its principal object to provide a means for and a method of coupling a retarding field tube with a network of a preceding stage, thereby to obtain efficient demodulation of signalling energy.

In my copending application, Serial No. 714,650, filed March 8, 1934, I disclosed a system in which demodulation of signalling energy might be obtained through the use of a retarding field tube having electrodes operated according to the teachings of Barkhausen and Kurz. In such a tube, assuming it to be a triode, the grid is maintained at a potential very much more positive than that of either the cathode or the plate. The invention as disclosed in my copending application, supra, had for its principal object to provide by means of a suitable leak resistance the necessary biasing potential for maintaining the plate substantially negative with respect to the grid and utilizing this arrangement for automatically adjusting the working point of the tube along its characteristic curve representing the ratio between input voltage and output current.

In the present invention I not only resort to the use of a similar biasing resistor for maintaining the retarding field electrode negative with respect to the potential applied to the grid, but I also adopt means such that incoming signalling energy may be first amplified and then applied across a capacitor of such low impedance to the modulated signalling energy that it may be suitably fed directly to the retarding field electrode of the Barkhausen-Kurz tube. This capacitor is placed in shunt with the biasing resistor W and acts as a short-circuit in respect to the ultra-short carrier waves, as well as in respect to the waves of modulation frequencies which may be superposed thereon.

The underlying idea of the invention is hereinafter explained in more detail, reference being had to the accompanying circuit diagram. $R_1$ is a normal radio frequency stage, say a screen grid tube, comprising the input circuit E and the output circuit A, whereby the oscillations coming in from the receiving aerial S are amplified. $R_2$ denotes a retarding field type of audion in that its grid is made to operate as an anode, and whose load consists of the audio frequency transformer T. The radio frequency oscillations arising in the circuit A are here impressed upon the retarding field electrode B by way of the coupling condenser C. In order that the working point may be located somewhere in the lower knee of the retarding field characteristic, as is necessary for demodulation, the retarding field electrode is connected by way of a leak resistor W, as disclosed in my copending application, supra. In the present case the plate potential of the retarding field tube $R_1$ rather than the grid potential $E_g$ of the retarding field tube serves as the leak potential. The leak resistance, therefore, is no longer connected with a point of fixed potential directly. On the other hand, no radio frequency potentials are applied across its ends or terminals, consequently the plate circuit A is not damped, which indicates that the gain of the screen grid tube $R_1$ is increased to a maximum value.

The condenser C supplies the retarding field electrode with the control potential. But, at the same time, according to this invention, it is to short-circuit the retarding field circuit; hence, it should be chosen so large that not only will it offer a very low impedance to the radio frequency current (as is the demand for every coupling capacity), but also for the modulation frequencies. Instead of the commonly used coupling capacities amounting to a few micromicrofarads, the condenser C should in the present instance have a value of several microfarads.

In the operation of my invention the grid of the tube $R_2$ is maintained at a suitable positive potential with respect to its cathode by means of the source $E_g$. The modulated signalling energy is collected by any suitable antenna S from which it is taken off in the resonant input circuit E and applied thence to the grid 2 of the electron discharge tube $R_1$. In the output circuit of the tube $R_1$ a resonant condition is obtained by means of the parallel inductance and capacitance A. This energy is then impressed across the capacitor C and applied to the plate B of the tube $R_2$. The resistor W in shunt with the capacitor C acts as a leak resistor for lowering the potential of B with respect to that of the grid 4 in the tube $R_2$. A capacitor C' cooperates with the retarding field impedance and provides suitable feed-back for enabling the Barkhausen-Kurz tube $R_2$ to oscillate. The oscillations set up therein are controlled by the incoming signalling energy and demodulation results. The audio frequencies thus obtained may then be translated from the primary to the secondary of the transformer T and utilized in any suitable output circuit.

What is claimed is:

1. In combination, in a radio receiver, a radio frequency stage comprising an electron discharge device having anode, grid and cathode electrodes, an input circuit connected between said control electrode and said cathode for impressing radio frequency energy thereon, another electron discharge device comprising a grid, cathode and anode, means for supplying a high positive potential to said last grid relative to its associated cathode and anode for obtaining a pendulum motion of the electrons emanating from said last cathode about said last grid, a connection including a condenser in parallel with a resistance between the anodes of both said devices, and an output circuit coupled to the grid of said last device.

2. A radio receiving circuit comprising an antenna, an input circuit coupled to said antenna, a screen grid tube having an anode, cathode and control electrode, the latter being coupled to one terminal of said input circuit and the cathode to the other, a second tube having an anode, cathode, and grid, a connection including a condenser and a resistance in parallel with one another coupling the anodes of both tubes together, an iron core transformer having primary and secondary windings, one terminal of said primary winding being coupled to the grid of said second tube and the other terminal of said primary winding being connected to a source of high positive potential, whereby there is a pendulum motion of electrons about said last grid, a condenser between the grid and anode of said second tube, and an output circuit coupled to the secondary winding of said transformer.

3. In a radio receiving system having an electron discharge tube adapted to operate with a retarding field between two of its electrodes, the method of accepting and demodulating signalling energy which comprises amplifying said energy in at least one stage, providing a resonant output circuit condition for said stage, feeding the amplified energy across a capacitance of such value as to offer a negligible impedance thereto, applying said energy directly to the retarding electrode of said electron discharge tube, causing said retarding electrode to be maintained at a negatively biased potential with respect to the other of the two electrodes between which the retarding field is produced, and effecting such negative bias by virtue of a high resistive impedance in shunt with that capacitance across which the signalling energy is fed, thereby to demodulate said energy.

HANS ERICH HOLLMANN.